United States Patent [19]

Schlein

[11] Patent Number: 4,611,964
[45] Date of Patent: Sep. 16, 1986

[54] ANCHOR NAIL FASTENER

[76] Inventor: Seymour N. Schlein, 312H Country Club Dr., Americus, Ga. 31709

[21] Appl. No.: 697,496

[22] Filed: Feb. 1, 1985

[51] Int. Cl.⁴ ............................................. F16B 15/00
[52] U.S. Cl. .................................... 411/356; 411/358; 411/21
[58] Field of Search .................... 411/21, 22, 356, 357, 411/358, 359, 479, 503, 496, 447, 446, 450, 922

[56] References Cited

U.S. PATENT DOCUMENTS

| | | | |
|---|---|---|---|
| 344,683 | 6/1886 | Sherer | 411/358 X |
| 594,253 | 11/1897 | Hinton | 411/359 |
| 744,144 | 11/1904 | Anderson | 411/358 |
| 931,869 | 8/1909 | Heinz | 411/447 |
| 958,127 | 5/1910 | Hovrud | 411/21 X |
| 984,142 | 2/1911 | Jones | 411/447 |
| 1,356,781 | 10/1920 | Nix | 411/358 |
| 1,548,456 | 8/1925 | Goodman | 411/359 |
| 2,137,688 | 11/1938 | Hojnowski | 411/358 |
| 3,177,753 | 4/1965 | Maginnis | 411/358 |
| 3,188,904 | 6/1965 | Owen | 411/358 |
| 3,396,624 | 8/1968 | Eriksson et al. | 411/22 |
| 3,455,200 | 7/1969 | Cumming | 411/22 |
| 3,519,704 | 7/1970 | Maginnis | 411/358 X |
| 4,456,416 | 6/1984 | Schlein | 411/358 |

FOREIGN PATENT DOCUMENTS

| | | | |
|---|---|---|---|
| 75727 | 5/1892 | Fed. Rep. of Germany | 411/358 |
| 1551125 | 11/1968 | France | 411/447 |
| 124484 | 3/1949 | Sweden | 411/447 |
| 12406 | of 1915 | United Kingdom | 411/447 |

Primary Examiner—Gary L. Smith
Assistant Examiner—Rodney M. Lindsey
Attorney, Agent, or Firm—Burton, Parker & Schramm

[57] ABSTRACT

The phenomenon of pop-back of the nail insert for anchor nail fasteners is prevented by providing a dimple-like indentation in the wall of the tube sufficient to grip the insert nail after it has been driven down the tube. For longer length anchor nails, two such dimple-like indentations may be provided.

3 Claims, 6 Drawing Figures

U.S. Patent  Sep. 16, 1986  4,611,964
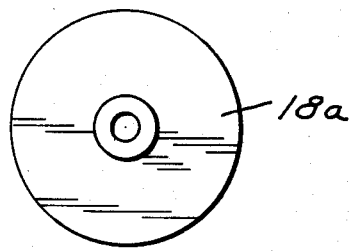
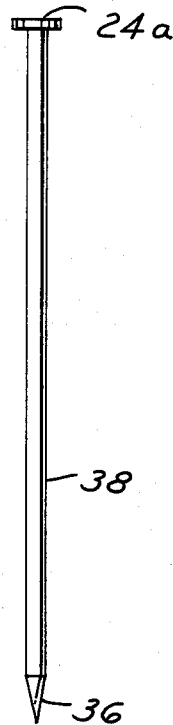
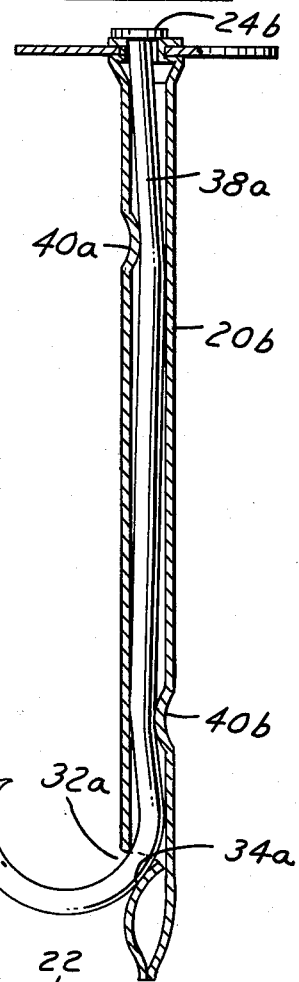
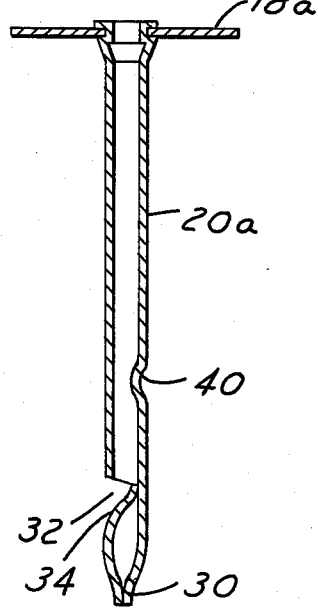
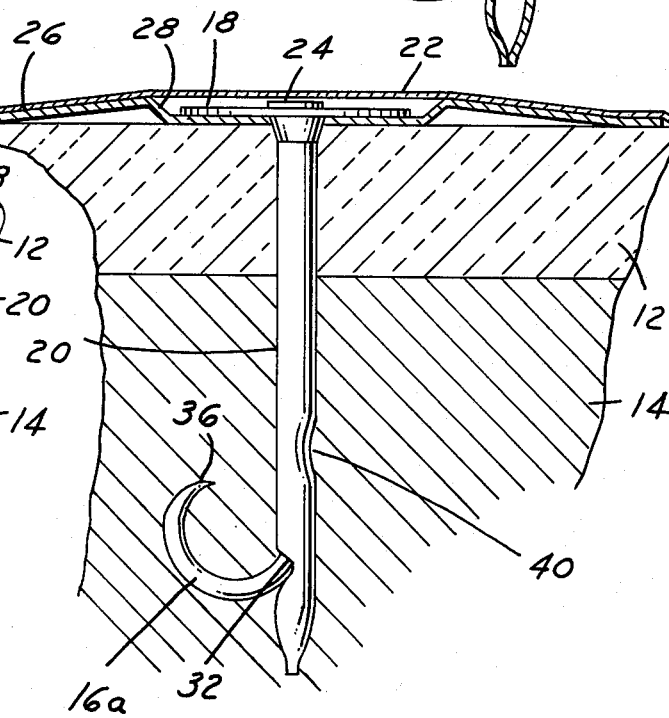
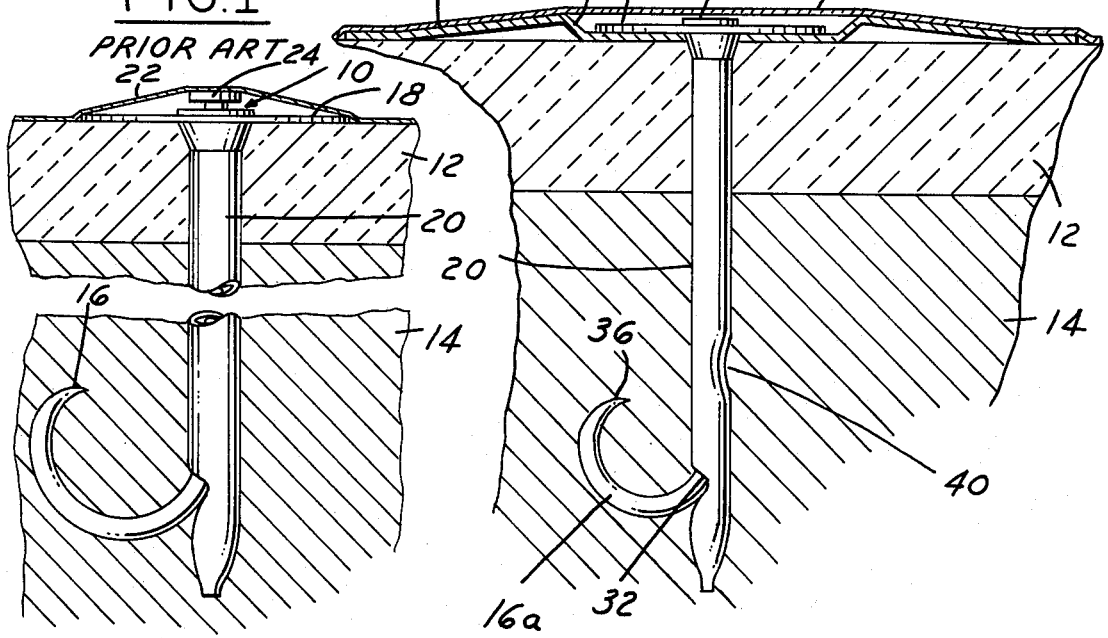

ANCHOR NAIL FASTENER

FIELD OF INVENTION

This invention relates to anchor nail fasteners of the kind used to secure insulation or other covering material to a low density roof deck or other low denisity material and especially adapted for use beneath single ply moisture barrier films.

PRIOR ART

Anchor nail fasteners of the general type to which this invention relates are shown in U.S. Pat. Nos. 3,177,753; 3,188,904; 3,519,704; and 4,456,416, which are herein incorporated by reference

BACKGROUND OF INVENTION

For many years anchor nail fasteners of the type shown in the aforesaid U.S. Letters Patent have been and are still being used successfully in built-up roof construction (termed B.U.R. in the trade) to hold insulation and roofing paper or the like on low-density roof decks. In constructing a B.U.R. using the anchor nail fasteners of the aforesaid patents, a fastener length is selected such that the tube portion extends completely through the insulation or other covering and into the underlying low density roof deck with the large head on the tube overlying the insulation or other covering to be retained on the deck. An anchoring nail insert is then driven down into the tube portion and its pointed end strikes a target or ramp near the lower end of the tube and curves out the side of the tube through an opening therein and is imbedded in the roof deck to securely hold the large head of the tube against the insulation or other covering, thereby retaining the same against the roof deck. After the insulation or other covering has been secured in this fashion, several layers of roofing felt or tar paper, together with applications of hot asphalt are applied thereover to seal the roof against the weather. Thus, a roof is built up covering the insulation and the heads of the anchor nail fasteners.

In recent years B.U.R. roof construction has been replaced in many instances by the so-called single ply memberane or thin film. Instead of laying down several layers of roofing felt or tar paper with intermediate coatings of hot asphalt, a single moisture barrier film is laid down over the insulation and over the fastener heads. The film may be as thin as 0.009 inches in some instances, while other types may range from 0.030 inches to 0.072 inches in thickness. Some of these films have little capability to stretch with movement of the building, and others, though quite stretchable, are so thin that they may be easily punctured. In either event, the anchor nail fastener must maintain a low profile and not project upwardly in such fashion as to cause a puncture of the film.

What has occurred, unfortunately, is that in some instances the anchor nail insert, though driven down securely in the tube, has popped back up slightly after the single ply membrane has been applied over the roof, and then through movement of the building causing the upwardly protruding head of the anchor nail insert to abrade the film, or by a person walking on the film and pressing it down at the popped-up anchor nail insert, the film has been ruptured, allowing moisture to creep beneath the film and eventually into the building. This problem has been so serious that the anchor nail fasteners of the type shown in the aforementioned patents have not been used with a single ply roof construction, and this has substantially reduced sales of these fasteners in today's market.

After considerable investigation, I discovered that the pop-back seemed to occure more often where the density of the roof deck was low. For example, in retrofitted roofs, the density of the decks is less than originally and pop-back was a frequent occurrence. In some new constructions, roof deck materials are being used of a lower density than in the past, or, as sometimes occurs, at the specific location where the insert curls into the deck there is a void in the deck.

SUMMARY OF THE INVENTION

Why pop-back did not occure as often with a higher density roof deck and more often with the lower density decks was very puzzling, and I finally concluded that the higher density roof decks actually gripped the anchor nail inserts and tended to prevent pop-back, while the lower density decks did not sufficiently grip the insert to prevent the pop-back.

This problem is broadly solved as disclosed in this application by having the tube itself grip the insert nail with sufficient force to overcome the tendency of the insert to pop back even in low density decking. At the same time, the gripping of the insert is not so tenacious as to prevent proper driving of the insert into the tube, nor does it so resist the driving of the insert that the enlarged head of the fastener at the end of the tube is unacceptably driven into the insulation or other convering material. In the preferred embodiments herein disclosed, the gripping of the insert nail is accomplished by "snaking" the nail as it is driven down into the tube, i.e., bending or deforming the nail within the tube above the laterally opening exit in the tube wall and holding the nail in such deformed condition.

The deformation is of insufficient magnitude to prevent proper driving of the insert but yet is sufficient that the axially upwardly directed forces tending to pop the nail insert back up the tube are less than those forces required to re-deform the nail during any such upward movement, and thus the nail remains properly seated in the tube and in the roof deck.

BRIEF DESCRIPTION OF THE DRAWINGS

FIG. 1 is a side elevation of a prior art anchor nail fastener showing the inset nail popped up, lifting a single ply film which is stretched thereover;

FIG. 2 is a top view of the tube portion of an anchor nail fastener;

FIG. 3 is a side elevation in cross section of the tube portion of an anchor nail fastener embodying one form of the invention;

FIG. 4 is a side elevation of an anchor nail insert useful with the tube of FIG. 3;

FIG. 5 is a side elevation partially in section of another form of anchor nail fastener embodying the invention; and FIG. 6 is a side elevation partially in section showing the anchor nail fastener of FIGS. 3 and 4 in place holding insulation in a low density roof deck.

DETAILED DESCRIPTION OF PREFERRED EMBODIMENTS

In FIG. 1 I have shown the prior art type anchor nail fastener generally indicated by 10 extending down through an insulation material 12 and into a low density roof deck 14 with the curved end 16 of the nail insert embedded in the low density roof deck. The enlarged head 18 at the upper end of the tube 20 overlies the insulation 12 to hold it against the roof deck 14. A single ply film 22 overlies the insulation 12 and extends over the head end of the fastener. The anchor nail has popped back up such that its head 24 has lifted the film 22 as clearly shown. This provides a point at which the film 22 may be easily ruptured, thereby allowing moisture to creep beneath the film, enter the insulation and eventually the building. This may occur either through a person stepping on the film 22 just above the head 24 of the anchor nail insert, or by movement of the film relative to the head 24, such as by movements in the building construction itself which cause a relative movement between the film and the head 24. Thus, when the film 22 works across the nailhead 24, a leak in the roof may occur.

To some extent the problem is alleviated by the use of a circular plate 26, FIG. 6, having a depression 28 within which the head 18 of the tube is centered, thereby raising the film 22 above the head of the nail insert and of the head portion 18 of the tube. But even such deck plate is insufficient to prevent rupture of the film if the pop-back of the nail insert is sufficient to raise the film slightly and create a point of contact where abrasion can eventually cause a rupture or where a person walking across the roof and stepping on the film may actually puncture the film against the raised head of the nail insert.

In FIG. 3 and the remaining figures of the drawings, I have used reference numerals corresponding to those of FIG. 1 with alphabetical suffixes. The tubular portion 20a terminates at one end in a point 30 and at the other is provided with a circular flange 18a. There is a side opening aperture 32 in the bottom of which is a target or ramp 34 formed by the inward punching of the tube wall to create the opening 32. The ramp serves to guide the pointed end 36 of the insert nail 38 laterally outwardly through the aperture 32 as shown at 16a in FIG. 6. The tubing is preferably seamless steel tubing anywhere from 0.025 to 0.030 inches oversize the wire diameter and formed of hardened carbon steel with a B-90 Rockwell hardness as discussed in U.S. Pat. No. 4,456,416, or for shorter length as, for example, one-inch long tubes, the material may be softer.

The nail insert 38 may comprise a 0.083 inch wire in the case of one-inch nails, and longer lengths are preferably in the range of 0.091 inches to 0.093 inches in diameter. The material is preferably 1010 steel or, for special applications to give greater pull-out resistance, may be 1022 steel. Above 1022 the nail is sufficiently hard so that it may in fact pierce the target or ramp 34.

The nail insert 38 is preferably made by a cold heading wherein the head 24a is upset by a deformation of the wire of which the nail is made, while the point 36 is provided with a reduced cross-section to reduce the modulus of bend so that the point will begin to bend as it encounters the target or ramp rather than digging in. The insert nail 38 is not annealed or otherwise specially treated. Typical wire for the insert nails 38 have a tensile strength in the range of 120,000 psi.

To prevent the pop-back shown in FIG. 1, and after considerable experimentation with tinning, galvanizing, plastic and other expedients in an effort to prevent the pop-back, I dimpled the tube as at 40 to provide an inwardly displaced tube wall portion within the tube so that the nail is snaked or deformed as it is driven down through the tube between the dimple 40 and the ramp or target 34. This deformation of the nail creates a resistance to pop-back which exceeds the tendency of the nail to pop back when embedded in low density decking. In shorter length nails, such as in 1- and 2-inch nails, i.e., where the length of the tube 20a is between one and 2 inches, I fould that a single dimple 40 disposed on that side of thetube opposite the opening 32 and spaced above the ramp 34, substantially as shown in FIG. 3, would prevent pop-back of the nail insert. If the dimple 40 is placed too close to the ramp 34, i.e., within about ⅜", the pop-back is not prevented.

In order for the deformation to effectively resist pop-back of the nail insert, the nail must be pinched between the dimple and the opposite wall of the tubular member thereby creating sufficient friction to overcome the forces tending to push the insert nail back up the tube. If the gripping force on the nail is sufficient to resist the forces tending to push the insert up the tube, the insert stays down in place and pop-back does not occur. Thus, the nail insert is effectively gripped by the dimple-like indentation within the tubular member and pop-back is prevented. The dimple should be deep enough to adequately grip the nail insert and yet not so deep that it unduly inhibits driving the insert down the tube. If the dimple is too deep, the flange 18a can be driven down into the low density material 12, or the insert nail may even bend.

When longer anchor nail fasteners are to be used, such as more than about 2 inches, for example, with 5- or 6-inch nails, I have found that it is necessary to provide more than one dimple. As shown in FIG. 5, the tube 20b is provided with a pair of dimples 40a and 40b. Dimple 40b is disposed as is the dimple 40 in FIG. 3, while dimple 40a is disposed on the opposite side of the tube from dimple 40b and preferably substantially in alignment with the opening 32a. It will be noted in the case of FIG. 5 that the nail insert 38a follows a clearly snaked configuration or deformation, first being pressed over and squeezed against the side of the tube opposite dimple 40b, and then against the tube wall just above the ramp or target 34a before curving laterally out of the opening 32a.

I claim:

1. In an anchor nail fastener having a tubular body member provided at one end with a head and pointed at the other end and with a side opening aperture with an internal ramp adjacent the pointed end from which an insert nail may curl as it is driven down through the tubular member, the improvement which comprises:
   a dimple-like identation in the wall of the tubular body member spaced between the side opening aperture and the head and disposed on that side of the tubular member opposite the aperture and operable to engage a nail insert and deform the same between it and the internal ramp at the aperture to prevent pop-back of the nail insert.

2. The invention defined by claim 1 further including an insert nail to be driven down through the tubular body member to be engaged by said dimple-like indentation to prevent pop-back of the nail insert.

3. The invention defined by claim 1 characterized in that there is another dimple-like indentation in the wall of the tubular body member on the opposite side of the tubular body member from the first mentioned dimple-like indentation and operable to engage a nail insert to help prevent pop-back of the nail insert.

* * * * *